United States Patent
Kim et al.

(10) Patent No.: US 11,201,933 B2
(45) Date of Patent: Dec. 14, 2021

(54) APPARATUS AND METHOD FOR DISTRIBUTING SOCIAL PRESENCE INFORMATION BASED ON CALENDAR EVENTS

(71) Applicant: Samsung Electronics Co., Ltd., Gyeonggi-do (KR)

(72) Inventors: Hyung Joo Kim, Bellevue, WA (US); Minseok Choi, Issaquah, WA (US)

(73) Assignee: Samsung Electronics Co., Ltd., Suwon-si (KR)

(*) Notice: Subject to any disclaimer, the term of this patent is extended or adjusted under 35 U.S.C. 154(b) by 262 days.

(21) Appl. No.: 14/804,708

(22) Filed: Jul. 21, 2015

(65) Prior Publication Data
US 2017/0026480 A1    Jan. 26, 2017

(51) Int. Cl.
*H04L 29/08*    (2006.01)
*H04W 4/16*    (2009.01)
(Continued)

(52) U.S. Cl.
CPC ......... *H04L 67/24* (2013.01); *G06Q 10/1093* (2013.01); *G06Q 10/1095* (2013.01);
(Continued)

(58) Field of Classification Search
CPC ..... H04L 67/24; H04L 67/10; G06Q 10/1093; G06Q 10/1095; G06Q 50/01; H04W 4/16
(Continued)

(56) References Cited

U.S. PATENT DOCUMENTS 7,466,810 B1    12/2008    Quon et al.
7,792,913 B2 *    9/2010    Chen .................... G06Q 10/107
                                                              455/443
(Continued)

FOREIGN PATENT DOCUMENTS

WO    2012117066 A1    9/2012

OTHER PUBLICATIONS

European Patent Office, "European Search Report," Application No. 16170276.6, dated Nov. 11, 2016, 9 pages, publisher EPO, Munich, Germany, Place of Search, The Hague.
(Continued)

*Primary Examiner* — Esther B. Henderson
*Assistant Examiner* — Nazia Naoreen

(57) ABSTRACT

A method of providing a social presence service in a mobile device. The method comprises: i) detecting in the mobile device a change in a calendar event associated with a first user; ii) in response to detecting the calendar event change, modifying in the mobile device social presence information associated with the first user; and iii) publishing the modified social presence information to a social presence server for subsequent sharing with a second user who has subscribed to the social presence information of the first user. The method further comprises: iv) synchronizing the changed calendar event to a calendar server that provides a calendar service to the first user. Detecting the change in the calendar event is performed by an IP multimedia subsystem (IMS) service in the mobile device. Modifying the social presence information is performed by an IP multimedia subsystem (IMS) service in the mobile device. Publishing the modified social presence information is performed by an IP multimedia subsystem (IMS) service in the mobile device.

18 Claims, 10 Drawing Sheets

(51) Int. Cl.
*G06Q 10/10* (2012.01)
*G06Q 50/00* (2012.01)

(52) U.S. Cl.
CPC ............ *G06Q 50/01* (2013.01); *H04L 67/10* (2013.01); *H04W 4/16* (2013.01)

(58) Field of Classification Search
USPC ........................................................ 709/204
See application file for complete search history.

(56) References Cited

U.S. PATENT DOCUMENTS

| | | | | |
|---|---|---|---|---|
| 8,359,356 | B2* | 1/2013 | Belz | G06F 15/163 709/204 |
| 8,600,360 | B1* | 12/2013 | Patvarczki | H04L 67/24 455/414.3 |
| 8,611,339 | B2* | 12/2013 | Jana | H04L 12/66 370/260 |
| 8,700,073 | B2* | 4/2014 | Macwan | H04L 12/1859 455/414.3 |
| 10,785,172 | B2* | 9/2020 | Cherifi | H04L 67/22 |
| 2003/0217109 | A1* | 11/2003 | Ordille | G06Q 10/00 709/206 |
| 2004/0122896 | A1 | 6/2004 | Gourraud | |
| 2004/0267887 | A1* | 12/2004 | Berger | G06Q 10/109 709/206 |
| 2005/0068167 | A1 | 3/2005 | Boyer et al. | |
| 2006/0195587 | A1 | 8/2006 | Cadiz et al. | |
| 2007/0233859 | A1 | 10/2007 | Zhao et al. | |
| 2014/0149511 | A1 | 5/2014 | Diaz et al. | |
| 2014/0372557 | A1* | 12/2014 | Buckley | H04L 67/104 709/217 |

OTHER PUBLICATIONS

Florian Wegscheider et al., "Minimizing Unnecessary Notification Traffic in the IMS Presence System," XP007906313, 2006, 6 pages, publisher IEEE, Piscataway, NJ.

Communication pursuant to Article 94(3) EPC dated Dec. 17, 2019 in connection with European Patent Application No. 16 170 276.6, 9 pages.

Summons to attend oral proceedings pursuant to Rule 115(1) EPC in connection with European Application No. 16170276.6 dated Jun. 15, 2020, 14 pages.

Singh, Vishal Kumar, et al., "Presence Traffic Optimization Techniques," XP002486721, Oct. 28, 2006, 16 pages.

* cited by examiner

APPARATUS AND METHOD FOR DISTRIBUTING SOCIAL PRESENCE INFORMATION BASED ON CALENDAR EVENTS

TECHNICAL FIELD

The present application relates generally to social networking and, more specifically, to enhanced presence information that enables a subscriber to get detailed information about the personal status of another subscriber based on calendar events.

BACKGROUND

Rich communication services (RCS) is a GSM Association (GSMA) program for the creation of inter-operator communication services based on IP Multimedia Subsystem (IMS). Along with RCS chat and file transfer (FT), Social Presence (SP) is one of the enhanced RCS features strongly desired by U.S. telecommunication carriers. Social Presence exchanges a greater amount of personal information between users than simple presence services, which typically provide little more than online/offline availability and device capabilities. Enhanced Social Presence information may include sharing geo-location information, links to Social Network sites (SNS), such as Facebook® and Twitter®, homepage information, user profile information, and the like.

The typical operation of a Social Presence server and subscriber mobile devise is described in Publication No. WO 2012117066 A1, which is entitled "Method For Providing Social Presence Information In Telecommunication Networks". Publication No. WO 2012117066 A1 is hereby incorporated into the present disclosure as if fully set forth herein.

However, in spite of such enhancements, most of the information a user (or subscriber) collects from a presence server for another user (or subscriber) remains static and is not very extensible. With the exception of geo-location information, typical SP information provided by current Social Presence systems changes rarely (e.g., User profile). The SP information is not dynamically updated nor is it reflected in the current status of the subscriber.

Therefore, there is a need in the art for an improved apparatuses and methods for providing social presence (SP) services. In particular, there is a need for apparatuses and methods for providing dynamic social presence (SP) services that automatically update and share modified SP information of a subscriber.

SUMMARY

To address the above-discussed deficiencies of the prior art, it is a primary object to provide a method of providing a social presence service in a mobile device. The method comprises: i) detecting in the mobile device a change in a calendar event associated with a first user; ii) in response to detecting the calendar event change, modifying in the mobile device social presence information associated with the first user; and iii) publishing the modified social presence information to a social presence server for subsequent sharing with a second user who has subscribed to the social presence information of the first user.

In one embodiment of the disclosure, the method further comprises: iv) synchronizing the changed calendar event to a calendar server that provides a calendar service to the first user.

In another embodiment, detecting the change in the calendar event is performed by an IP multimedia subsystem (IMS) service in the mobile device.

In still another embodiment, modifying the social presence information is performed by an IP multimedia subsystem (IMS) service in the mobile device.

In yet another embodiment, publishing the modified social presence information is performed by an IP multimedia subsystem (IMS) service in the mobile device.

It is another object to provide a mobile device configured to provide a social presence service. In one embodiment, the mobile device comprises: 1) transmit path circuitry and receive path circuitry configured to communicate with a social presence server; and processing circuitry configured to control the transmit path circuitry and receive path circuitry. The processing circuitry is further configured to: i) detect in a calendar application on the mobile device a change in a calendar event associated with a first user of the mobile device; ii) in response to detecting the calendar event change, modify in the mobile device social presence information associated with the first user; and iii) publish the modified social presence information to a social presence server for subsequent sharing with a second user who has subscribed to the social presence information of the first user.

In one embodiment, the processing circuitry is further configured to synchronize the changed calendar event to a calendar server that provides a calendar service to the first user.

In another embodiment, the processing circuitry detects the change in the calendar event using an IP multimedia subsystem (IMS) service in the mobile device.

In still another embodiment, the processing circuitry modifies the social presence information using an IP multimedia subsystem (IMS) service in the mobile device.

In yet another embodiment, the processing circuitry publishes the modified social presence information using by an IP multimedia subsystem (IMS) service in the mobile device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The present disclosure describes a Social Presence service that provides capabilities for exchanging dynamic user presence information. The invention enables a first user (or subscriber) to get detailed information of the personal status of a second user or to notify a second user of the current activity of the first user based on calendar events. Changes in the calendar of a subscriber are synced to "My Profile" and are notified to another subscriber dynamically upon request. Thus, Calendar Utilized Social Presence (RCS) is an enhanced Social Presence service using Calendar events to exchange dynamically changing presence information.

Figure 1:
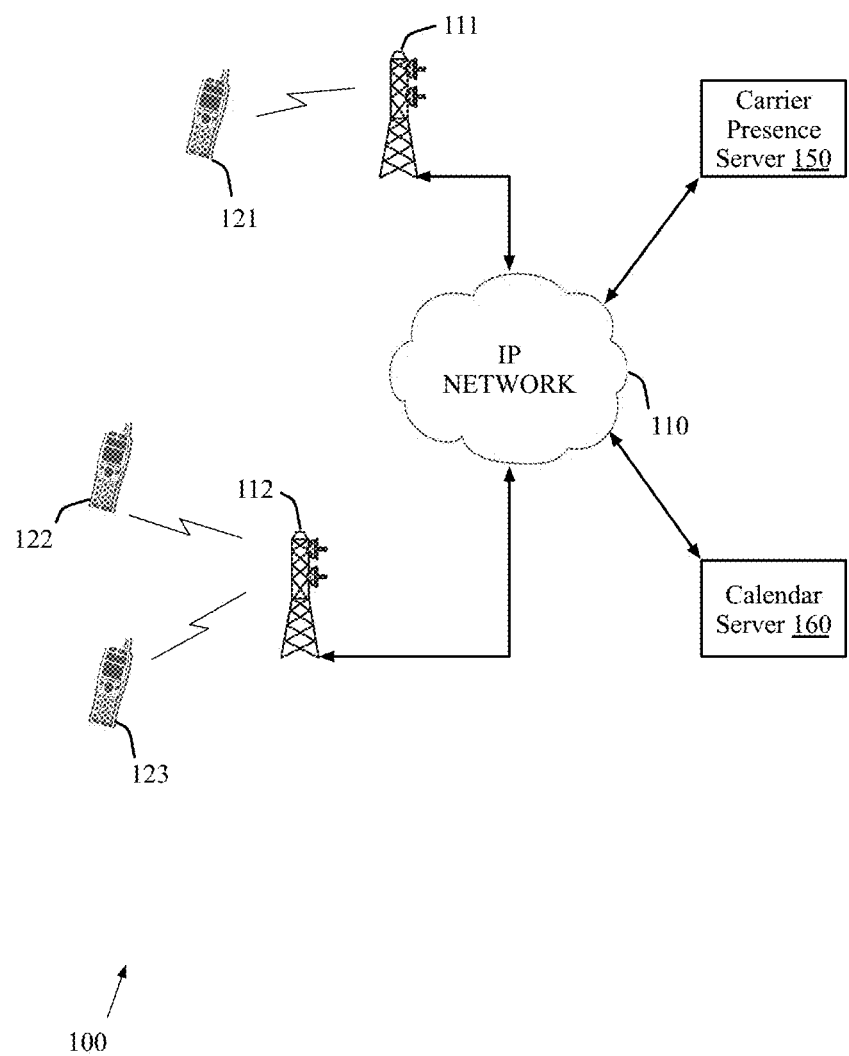
FIG. 1 illustrates a communication network in which calendar-based social presence information may be distributed according to embodiments of the disclosure.

FIG. 1 illustrates communication network 100 in which calendar-based social presence information may be distributed according to embodiments of the disclosure. Carrier Social Presence (SP) server 150 and calendar server 160 provide calendar-based Social Presence (SP) services and SP information to user equipment (UE) 121, user equipment (UE) 122, and user equipment (UE) 123, among other mobile devices. Carrier SP server 150 is operated by a telecommunications carrier (e.g., Verizon, ATT, etc.). Calendar server 160 is a calendar cloud server that provides an on-line calendar. Calendar server 160 may be, for example, a Google service that supports the calendar application on Android mobile phones.

Wireless network 100 includes base station (BS) 111 and BS 112. BS 111 and BS 112 may communicate with each other via wireless links or by a wireline backbone network (e.g., optical fiber, DSL, cable, T1/E1 line, etc.). By way of example, in FIG. 1, each of base stations 111 and 112 is configured to communicate with other base stations using Internet protocol (IP) network 110, which may be, for example, the Internet, a proprietary IP network, or another data network. Each of base stations 111 and 113 is also configured to communicate with a conventional circuit-switched telephone network (not shown), either directly or by means of network 110.

BS 111 provides wireless broadband access to network 110 to a first plurality of user equipments (UEs) within a coverage area of BS 111. The first plurality of UEs includes user equipment (UE) 121, among others. BS 112 provides wireless broadband access to network 110 to a second plurality of UEs within a coverage area of BS 112. The second plurality of UEs includes UE 122 and 123, among others.

Each of base stations 111 and 112 may provide different levels of service to UEs 121-123 according to priority levels (common and/or dedicated) associated with each UE. For example, BS 111 may provide a T1 level service to UE 121 or may provide a fractional T1 level service to UE 121. UEs 121-123 may use the broadband access to network 110 to access voice, data, video, video teleconferencing, and/or other broadband services. Each one of UEs 121-123 may be any of a number of types of wireless devices, including a wireless-enabled laptop computer, a personal data assistant, a notebook, a mobile phone, a tablet, or another wireless-enabled device.

It is noted that the term "base station" may be commonly used in some types of networks, such as CDMA2000 systems or some 3GPP systems. But "base station" is not universally used in all types of radio access technology (RAT). In some types of networks, the term "base station" may be replaced by "eNodeB", or "eNB", or "access point". For the purposes of simplicity and consistency, the term "base station" is used in this disclosure document, and in the claims in particular, to refer to the network infrastructure device that provides wireless access to user equipment.

Similarly, the term "user equipment" may be commonly used in some types of networks, but not in others. In some types of networks, the term "user equipment" may be replaced by "subscriber station", "mobile station", "remote terminal", "wireless terminal" or the like. For the purposes of simplicity and consistency, the term "user equipment", or "UE", or mobile phone, may be used in this disclosure document to refer to a remote wireless device that accesses the network infrastructure device (i.e., the base station).

Figure 2:
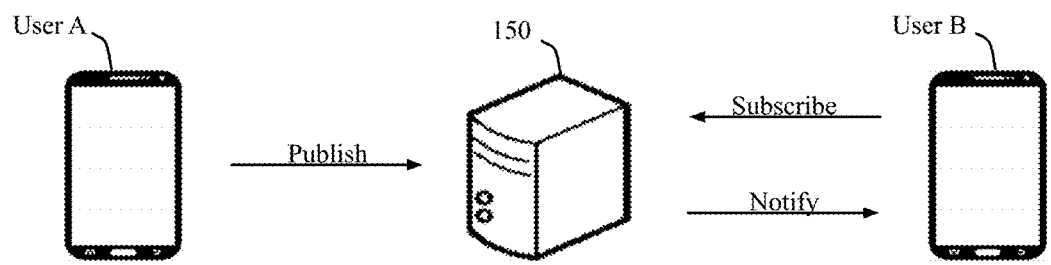
FIG. 2 illustrates a simplified presence sharing system according to embodiments of the disclosure.

FIG. 2 illustrates a simplified presence sharing system according to embodiments of the disclosure. Two subscribers, referred to as "User A" and "User B", receive Social Presence (SP) services and Social Presence (SP) information from Social Presence (SP) server 150. The wireless devices used by User A and User B will be referred to as User A mobile phone and User B mobile phone. In FIG. 2, User A mobile phone transmits updated calendar events to SP server 150 in a Publish message. User B requests SP information related to User B mobile phone in a Subscribe message and receives the dynamic SP information in a Notify message whenever User A modifies or creates a Calendar event. SP information may include geo-location information, SNS information, homepage information, e-mail, Mood text, profile photo, a Calendar current event, and the like.

Figure 3:
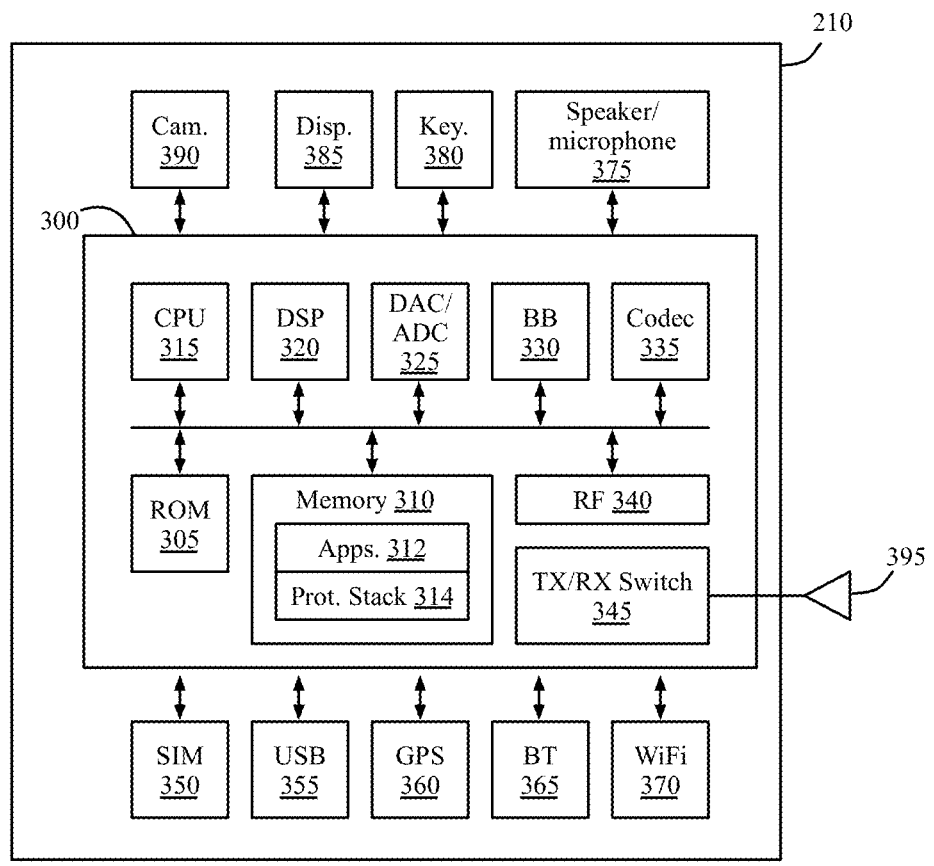
FIG. 3 illustrates in greater detail an exemplary mobile phone that shares calendar-based social presence information according to embodiments of the disclosure.

FIG. 3 illustrates in greater detail exemplary mobile phone 121 that shares calendar-based social presence information according to embodiments of the disclosure. Mobile phone 121 is representative of User A mobile phone and User B mobile phone. Mobile phone 121 includes a social presence application (i.e., RCS Presence service) according to the principles of the disclosure. Mobile phone 121 comprises core circuitry 300, which includes read-only memory (ROM) 305, random access memory (RAM) 310, central processing unit (CPU) 315, digital signal processor (DSP)

320, digital-to-analog converter (DAC)/analog-to-digital converter (ADC) circuitry 325, baseband (BB) circuitry block 330, codec circuitry block 335, radio frequency (RF) circuitry block 340, transmit (TX)/receive (RX) switch 345, and antenna 395.

In one embodiment, ROM 305 may store a boot-routine and other static data and RAM 310 may store an operating system (not shown), applications 312, and protocol stack 314. In an advantageous embodiment, ROM 305 and RAM 310 may comprise a single electronically erasable memory, such as a Flash memory, that is used in conjunction with a conventional RAM memory that is used to store dynamic data. Applications in memory 312 may include a social presence application (i.e., RCS Presence) that interacts with carrier SP server 150, an IP multimedia subsystem (IMS) framework that delivers IP multimedia services, a Calendar application that communicates with calendar server 160, and specific Social Network Site (SNS) applications (e.g., Facebook, Twitter), and the like that enable mobile phone 121 to exchange SP information with mobile phones used by other subscribers.

Mobile phone 121 further comprises SIM card interface 350, USB interface 355, GPS receiver 360, Bluetooth (BT) transceiver 365, WiFi (or WLAN) transceiver 370, speaker and microphone circuitry block 375, keyboard 380, display 385, and camera 390. In some embodiment, keyboard 380 and display 385 may be implemented together as a touch screen display.

CPU 315 is responsible for the overall operation of mobile phone 121. In an exemplary embodiment, CPU 315 executes applications 312 and protocol stack 314. CPU 315 runs the application layer and a wide variety of applications may be run in a smart phone implementation. Applications 312 may include audio, video, and image/graphics applications. CPU 315 may run applications 312 that support various audio formats such as MP3, MP4, WAV, and rm. CPU 315 may run image applications 312 that support JPEG image formats and video applications 312 that support video formats (e.g., MPEG-1 to MPEG-5). CPU 315 may support various operating systems (not shown), such as Symbian, java, android, RT-Linux, Palm, and the like. For time critical applications, CPU 315 runs a real-time operating system (RTOS). In addition to the physical layer, there are other layers, including protocol stack 314, that enable mobile phone 121 to work with a network base station. In an exemplary embodiment, protocol stack 314 is ported on CPU 315.

DAC/ADC circuitry block 325 converts analog speech signals to digital signals, and vice versa, in mobile phone 121. In the transmit path, the ADC-converted digital signal is sent to a speech coder. Various types of ADCs are available, including sigma delta type. Automatic gain control (AGC) and automatic frequency control (AFC) are used in the receive path to control gain and frequency. AGC helps maintain satisfactory DAC performance by keepings signals within the dynamic range of the DAC circuits. AFC keeps frequency error within limit to achieve better receiver performance.

Baseband (BB) circuitry block 330 may be implemented as part of DSP 320, which executes many of the baseband processing functions (i.e., physical layer, Layer 1, or L1 functions). BB circuitry block 300 may be ported on DSP 320 to meet the latency and power requirements of mobile phone 121. BB circuitry block 330 converts voice and data to be carried over the air interface to I/Q baseband signals.

BB circuitry block 330 may change from modem to modem for various air interface standards, such as GSM, CDMA, Wimax, LTE, HSPA, and others. BB circuitry block 330 is often referred to as the physical layer, or Layer 1, or L1. For mobile phones that work on GSM networks, the baseband part (Layer 1) running on DSP 320 and the protocol stack 314 running on CPU 315 are based on the GSM standard. For CDMA mobile phones, the Layer 1 and protocol stack 314 are based on the CDMA standard, and so on, for the LTE and HSPA standards-based mobile phones.

For speech or audio inputs, codec circuitry block 335 may compress and decompress the signal to match the data rate to the frame in which the data is sent. By way of example, codec circuitry block 335 may convert speech at an 8 KHz sampling rate to a 13 kbps rate for a full rate speech traffic channel. To do this, a residually excited linear predictive coder (RELP) speech coder may be which compresses 260 bits into a 20 millisecond duration to achieve a 13 kbps rate.

The baseband or physical layer adds redundant bits to enable error detection as well as error correction. Error detection may be obtained with CRC and error correction using forward error correction techniques, such as a convolutional encoder (used in transmitter path) and a Viterbi decoder (used in receive path). Interleaving may be done for the data, which helps in spreading the error over time, thereby helping the receiver de-interleave and decode the frame correctly.

RF circuitry block 340 includes an RF up-converter and an RF down-converter. For a GSM system, the RF up-converter converts modulated baseband signals (I and Q) either at zero intermediate frequency (IF) or some IF to RF frequency (890-915 MHz). The RF down-converter converts RF signals (935 to 960 MHz) to baseband signals (I and Q). For a GSM system, GMSK modulation is used.

Antenna 395 is a metallic object that converts and electromagnetic signal to and electric signal and vice versa. Commonly used antennas may include a helix type, a planar inverted F-type, a whip, or a patch type. Microstrip patch type antennas are popular among mobile phones due to small size, easy integration on a printed circuit board and multi-frequency band of operation. In a preferred embodiment of mobile phone 121, antenna 395 may support different wire-area standards, including GSM, CDMA, LTE, and WiMAX, as well as short-range standards, including WiFi (WLAN), Bluetooth, and so on.

If antenna 395 comprises only one antenna used for both transmit and receive operations at different times, the TX/RX switch 345 couples both the transmit (TX) path and the receive (RX) path to antenna 395 at different times. TX/RS switch 345 is controlled automatically by DSP 320 based on a GSM frame structure with respect to the physical slot allocated for that particular GSM mobile phone in both the downlink and the uplink. For frequency division duplexing (FDD) systems, TX/RX switch 345 may be implement as a diplexer that acts as filter to separate various frequency bands.

Mobile phone 121 provides connectivity with laptops or other devices using WiFi (or WLAN) transceiver 370, BT transceiver 365, and universal serial bus (USB) interface 355. Mobile phone 121 also uses GPS receiver 360 in applications 312 that require position information. If mobile phone 121 is a conventional smart phone, applications 312 may include many popular applications, such as Facebook, Twitter, a browser, and numerous games that come pre-installed with mobile phone 121.

Speaker and microphone circuitry block 375 comprises microphone circuitry (or mic) that converts acoustic energy (i.e., air pressure changes caused by speech or other sounds) to electrical signals for subsequent processing. Speaker and microphone 375 further comprises speaker circuitry that converts an electrical audio signal to an audible signal (pressure changes) for human hearing. The speaker circuitry may include an audio amplifier to get required amplification of the audio signal and may further include a volume control circuit to change (increase or decrease) the amplitude of the audio signal.

Mobile phone 121 preferably includes camera 390. Presently, almost all mobile phones feature a camera module. Camera 390 may comprise a 12 megapixel, 14 megapixel, or a 41 megapixel camera.

Display 385 may comprise, by way of example, a liquid crystal display (LCD), a thin-film transistor (TFT) screen, and organic light emitting diode (OLED) display, a thin film diode (TFD) display, or a touch screen of capacitive and resistive type.

In a simple embodiment, keypad 380 may comprise a simple matrix type keypad that contains numeric digits (0 to 9), alphabetic characters (A to Z), special characters, and specific function keys. In a more advanced embodiment for a smart phone implementation, keypad 380 may be implemented in the mobile phone software, so that keyboard 380 appears on display 385 and is operated by the user using the touch of a finger tip.

Figure 4:
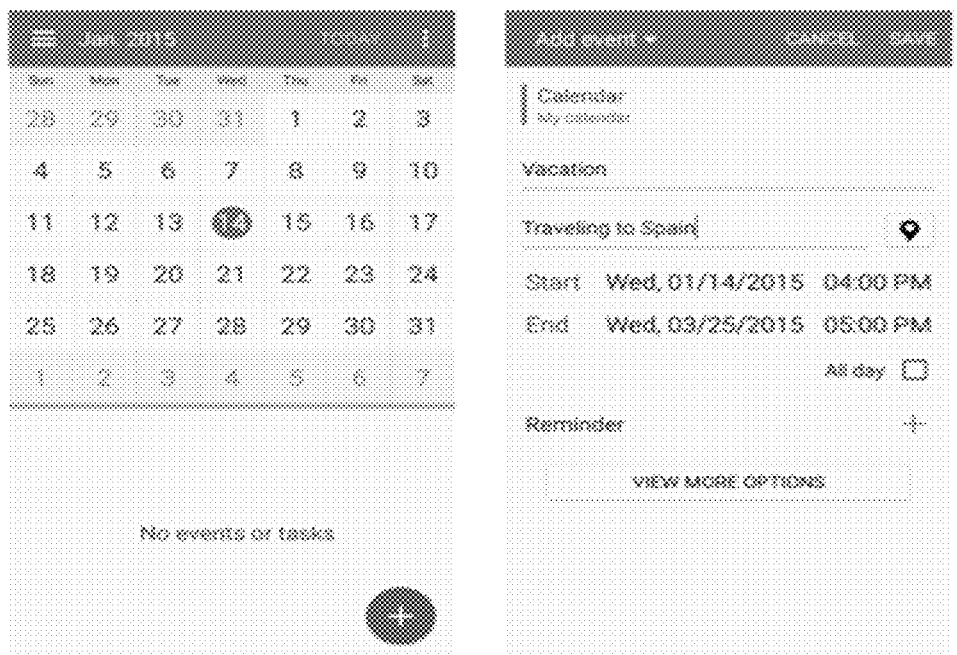
FIG. 4 illustrates a publishing calendar event on a user interface of a mobile phone according to embodiments of the disclosure.

FIG. 4 illustrates a publishing calendar event on a user interface of a mobile phone according to embodiments of the disclosure. In FIG. 4, User A enters a new calendar event "Traveling to Spain" in the Calendar application. The new event begins on Jan. 14, 2015 and ends on Mar. 25, 2105. On top of RCS Presence operation, the IMS framework in User A mobile phone queries the Calendar Provider (i.e., calendar server 160), which may frequently pull current SP-related information of User A. At each Calendar event time, User A status reflects the Calendar event and publishes the event to carrier SP server 150, along with the other presence information. On the other side of the exchange, when User B enters a Contact detail or views a Contact list, for example, the subscription of User B to carrier SP server 150 is triggered for the selected/listed contacts. Once carrier SP server 150 notifies the published SP information to the subscriber (User B), the subscriber know the actual personal status of the other user (User A), not just the device availability, such as chat or video call availability.

Figure 5:
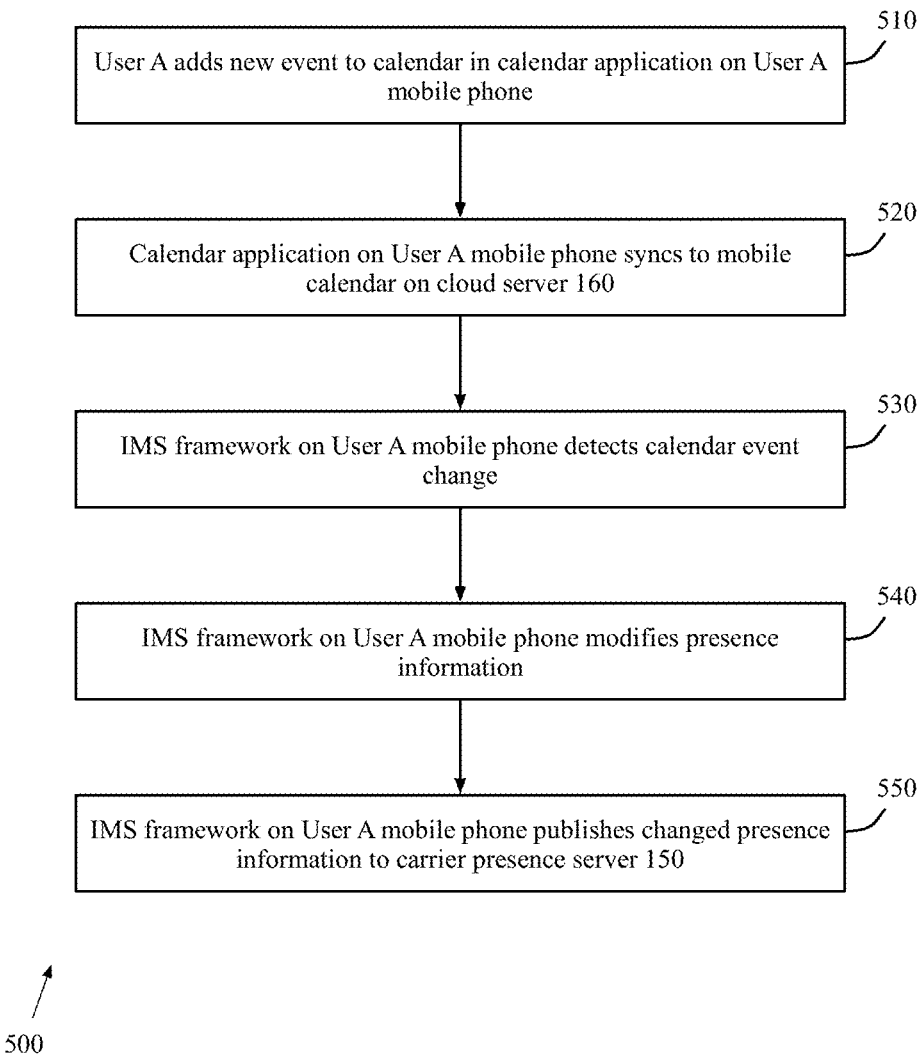
FIG. 5 is a flow diagram illustrating a publishing calendar event according to embodiments of the disclosure.

FIG. 5 depicts flow diagram 500, which illustrates a publishing calendar event according to embodiments of the disclosure. Flow diagram 500 forwards the Calendar Event upon the exchange of Social Presence information. Initially, User A adds a new event to his or her calendar in the calendar application on User A mobile phone (step 510). In response, the calendar application on User A mobile phone syncs to the mobile calendar service on cloud server 160 (step 520). Also, the IMS framework on User A mobile phone detects the calendar event change (step 530). In response, the IMS framework on User A mobile phone modifies the social presence (SP) information for User A to reflect the changed calendar event (step 540). Next, the IMS framework on User A mobile phone publishes the changed presence information to carrier SP server 150 (step 550). In this manner, the updated calendar information ("James is traveling in Spain") can be shared with User B and others who subscriber to the SP information of User A (i.e., "James").

Figure 6:
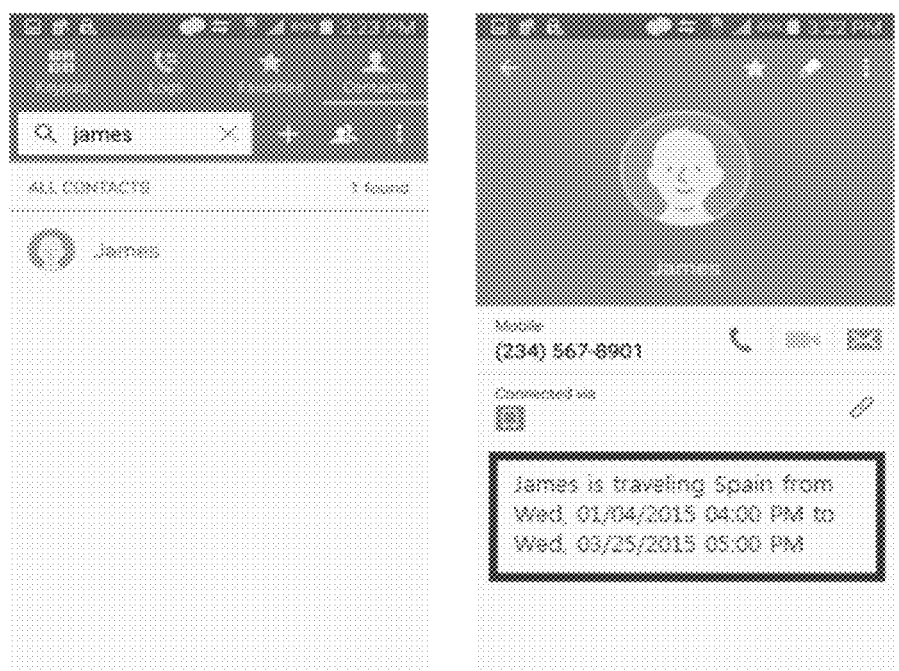
FIG. 6 illustrates a subscribing calendar event on a user interface of a mobile phone according to embodiments of the disclosure.

FIG. 6 illustrates a subscribing calendar event on a user interface of a mobile phone according to embodiments of the disclosure. In FIG. 6, User B selects the Contact for User A ("James") in the Calendar application on User B mobile phone. In response, User B receive the SP information that "James is traveling to Spain from Wed. 01/04/2015 04:00 PM to Wed. 03/25/2015 05:00 PM" in the Calendar application.

Figure 7:
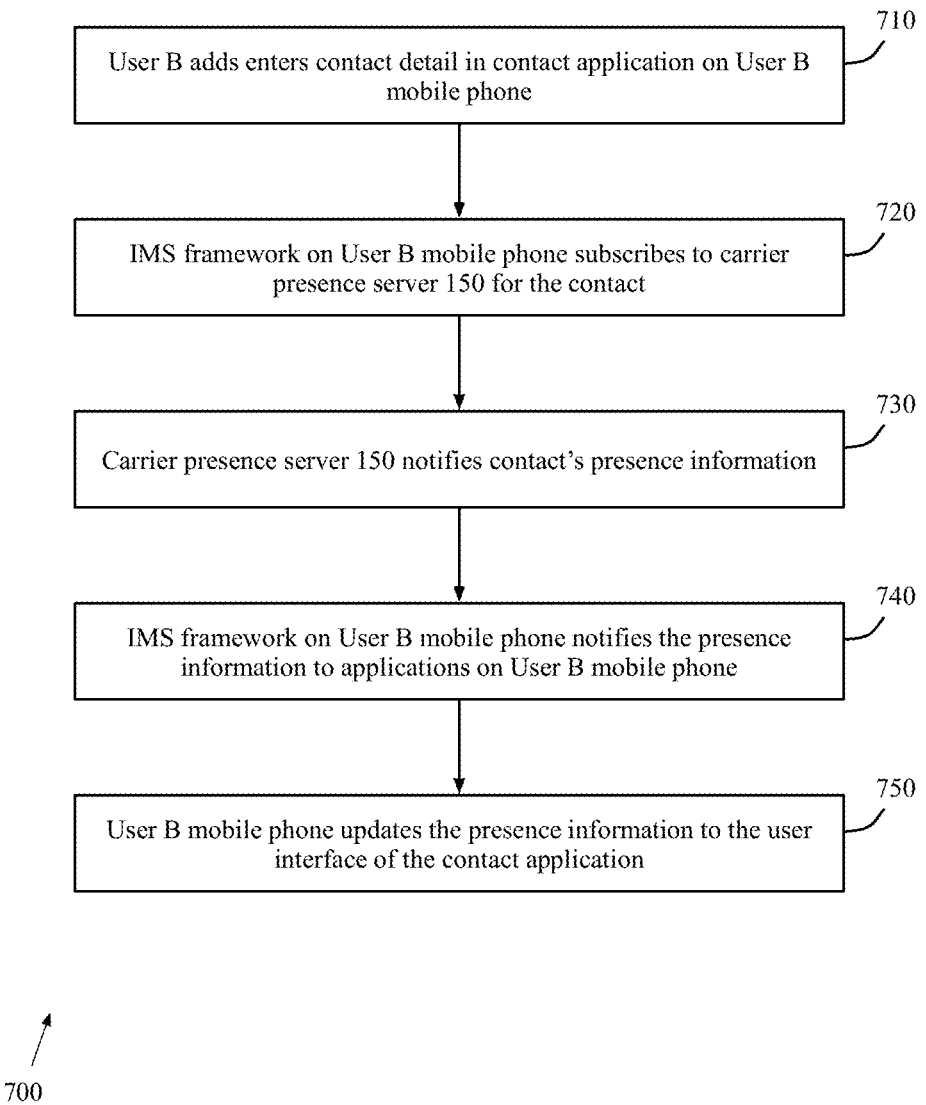
FIG. 7 is a flow diagram illustrating a subscribing calendar event according to embodiments of the disclosure.

FIG. 7 depicts flow diagram 700, which illustrates a subscribing calendar event according to embodiments of the disclosure. Initially, User B enters a contact detail for User A in the contact application on User B mobile phone (step 710). In response, the IMS framework on User B mobile phone subscribes to carrier SP server 150 for the User A contact (step 720). Next, carrier SP server 150 notifies (sends) the updated social presence (SP) information of User A to User B mobile phone (step 730). In response, the IMS framework on User B mobile phone notifies the presence information to the necessary social presence applications on User B mobile phone (step 740). Finally, User B mobile phone updates the presence information to the user interface (UI) of the Contact application (step 750). As a result, User B sees in the window for the User A contact the message "James is traveling to Spain from Wed. 01/04/2015 04:00 PM to Wed. 03/25/2015 on 05:00 PM".

Figure 8:
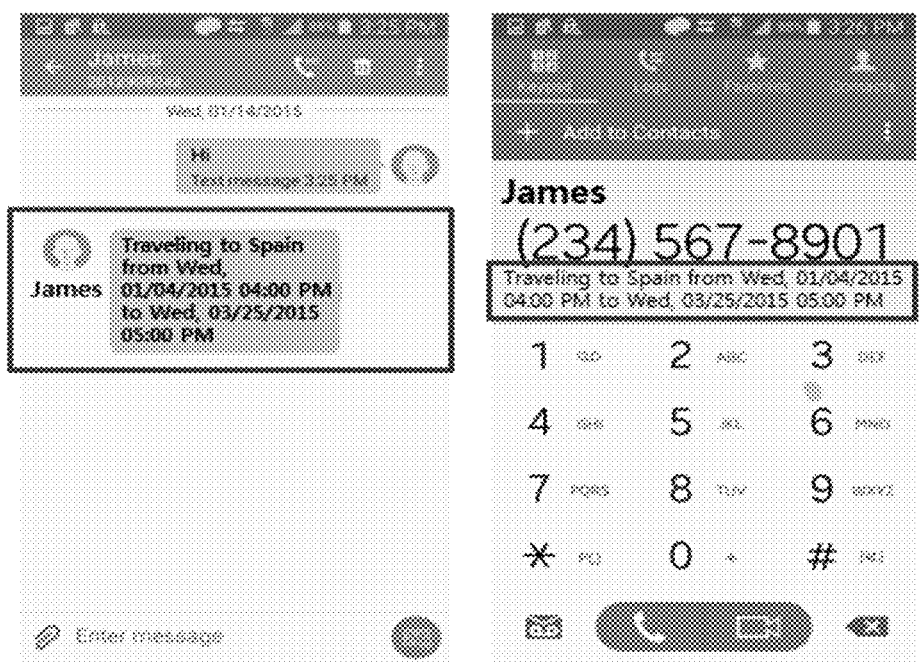
FIG. 8 illustrates auto-reply and notification based on a calendar event on a user interface of a mobile phone according to embodiments of the disclosure.

FIG. 8 illustrates auto-reply and notification based on a calendar event on a user interface of a mobile phone according to embodiments of the disclosure. In FIG. 8, User B selects the Contact for User A ("James") and attempts to initiate a Video Call session or RCS Chat session in the Calendar application on User B mobile phone. In response, User B receive the SP information that "James is traveling to Spain from Wed. 01/04/2015 04:00 PM to Wed. 03/25/2015 05:00 PM" in the Phone application window (Video Call) or the Message application window (RCS Chat).

As noted, the auto-reply notification may occur, for example, upon a Video Call attempt of an RCS Chat Attempt. As above, subscription to a designated contact occurs before a "Video Call/RCS Chat" session is established. This is to check User capability and availability. At this point, User B can collect the presence information of User A, including the personal Calendar event, which has been scheduled on the User A calendar and published to carrier SP server 150 upon a Calendar event change.

Figure 9:
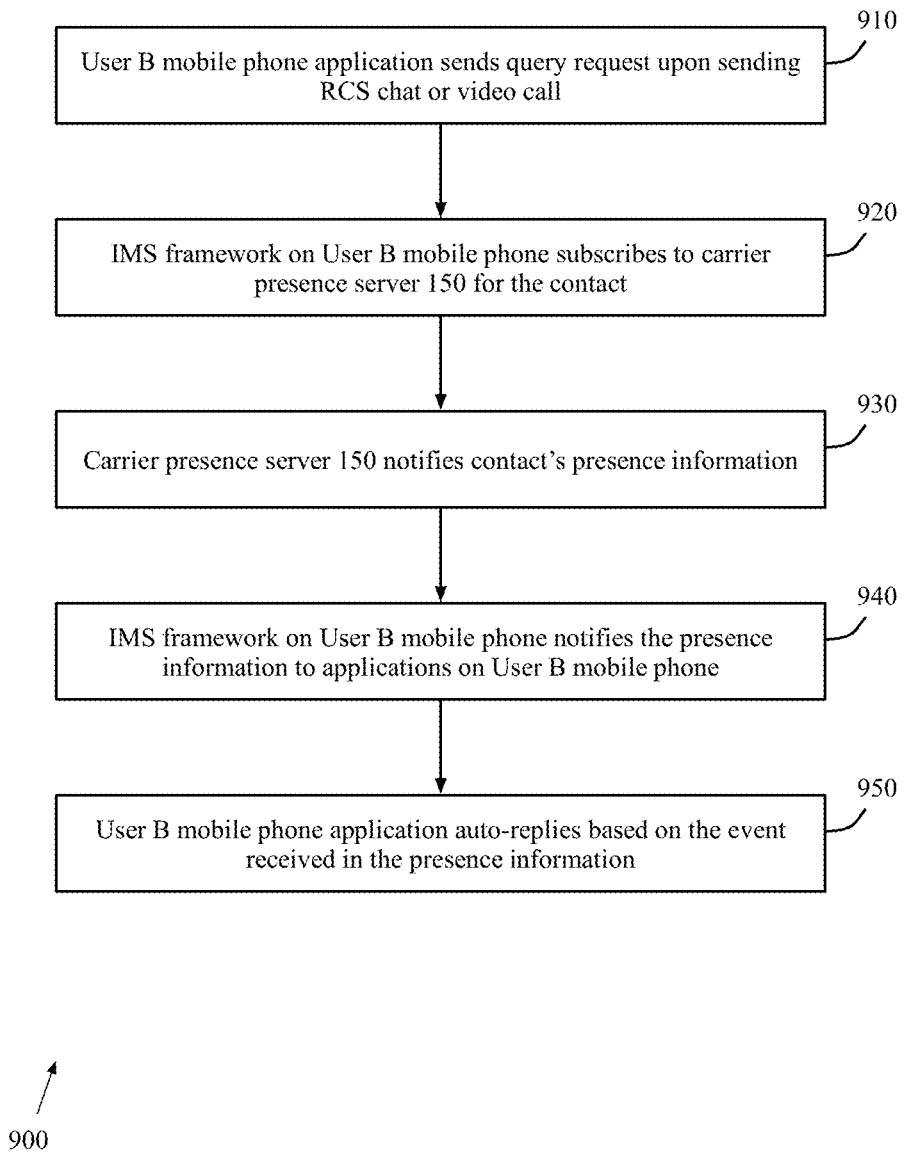
FIG. 9 is a flow diagram illustrating auto-reply and notification based on a calendar event according to embodiments of the disclosure.

FIG. 9 depicts flow diagram 900, which illustrates auto-reply and notification based on a calendar event according to embodiments of the disclosure. Initially, an application on User B mobile phone sends a query request when initiating an RCS chat or a video call (step 910). In response, the IMS framework on User B mobile phone subscribes to carrier SP server 150 for the contact (i.e., User A) (step 920). In response, carrier SP server 150 notifies the presence information for User A (step 930). Next, the IMS framework on User B mobile phone notifies the presence information to selected applications on User B mobile phone (step 940). Finally, the application on User B mobile phone auto-replies based on the event received in the SP information (step 950).

Preferably, the actions described above are provided with extra attention to security protections in order to protect subscriber privacy. Social Presence provides an invitation and acceptance procedure in which, for example, User A mobile phone sends an Invite message to User B mobile phone through carrier SP server 150. In response, User B mobile phone sends an Accept message to User A mobile phone through carrier SP server 150. Similarly, to complete the secure exchange in both directions, User B mobile phone sends an Invite message to User A mobile phone through carrier SP server 150. In response, User A mobile phone sends an Accept message to User B mobile phone through carrier SP server 150. If the invitation and acceptance procedure is not performed, SP information cannot be shared. One of the Social Presence features, geo-location, runs another authentication procedure before sharing location information. And for Calendar event sharing via Social Presence, the subscriber should perform the same process to ensure the secure connection with only selected contacts.

Figure 10:
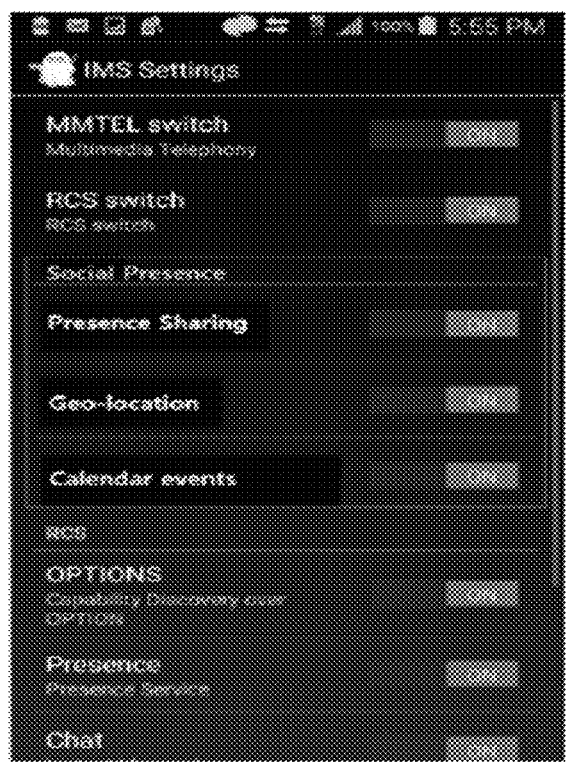
FIG. 10 illustrates secure settings for exchanging calendar events on a user interface of a mobile phone according to embodiments of the disclosure.

FIG. 10 illustrates secure settings for exchanging calendar events on a user interface of a mobile phone according to embodiments of the disclosure. In FIG. 10, the subscriber (e.g., User A) has set the Social Presence settings in the Android phone menu such that Presence Sharing, Geolocation. and Calendar events are all enabled.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of providing a social presence service in a mobile device, the method comprising:
   in response to a calendar event being added to a calendar application on the mobile device, synchronizing the calendar event on the calendar application to a calendar server providing a calendar service to a first user;
   querying, by an IP multimedia subsystem (IMS) framework in the mobile device, the calendar server for social presence information associated with the first user of the mobile device;
   modifying the social presence information associated with the first user of the mobile device to reflect the calendar event, the modified social presence information indicating whether the first user is available for communication with a second user that is subscribed to the social presence information associated with the first user; and
   in response to modifying the social presence information, publishing the modified social presence information to a social presence server for sharing with a second mobile device associated with the second user;
   wherein, when an indication is received by the social presence server from a communication application in the second mobile device based on the second mobile device initiating a communication request with the mobile device of the first user via the communication application at a time when the modified social presence information of the first user indicates that the first user is not available for communication, the social presence server is configured to provide the modified social presence information of the first user to the second mobile device, and the communication application in the second mobile device is configured to generate an auto-reply notification indicating that the first user is not available for communication and including the modified social presence information of the first user.

2. The method of claim 1, wherein publishing the modified social presence information associated with the first user is a trigger event for an auto-reply by the second mobile device.

3. The method of claim 1, wherein the IMS framework comprises part of a rich communication services (RCS) program on the mobile device.

4. The method of claim 1, wherein the mobile device of the first user is a subscriber to a different carrier than the second mobile device.

5. The method of claim 1, wherein the social presence information associated with the first user further comprises location information.

6. A method of providing a social presence service to a mobile device, the method comprising:
   receiving, via a network by a social presence server from a first mobile device, social presence information associated with a calendar event created by a first user, wherein the social presence information indicates whether the first user is available for communication;
   receiving, by the social presence server from an IP multimedia subsystem (IMS) framework in a second mobile device associated with a second user, a subscription request for the social presence information associated with the first user;
   determining that the social presence information associated with the first user can be shared with the second mobile device based on the social presence server previously receiving an invite message from the first mobile device, forwarding the invite message to the second mobile device, receiving an acceptance message from the second mobile device, and forwarding the acceptance message to the first mobile device;
   after receiving the subscription request, receiving an indication from a communication application in the second mobile device based on the second mobile device initiating a communication request with the first mobile device of the first user via the communication application; and
   in response to receiving the indication from the second mobile device at a time when the social presence information associated with the first user indicates that the first user is not available for communication, sending, by the social presence server to the second mobile device, the social presence information of the first user, wherein the communication application in the second mobile device is configured to generate an auto-reply notification indicating that the first user is not available for communication and including details of the calendar event.

7. The method of claim 6, wherein the social presence information is received by an IMS service in the social presence server.

8. The method of claim 6, wherein the subscription request is received by an IMS service in the social presence server.

9. The method of claim 6, wherein the social presence information is transmitted by an IMS service in the social presence server.

10. A mobile device configured to provide a social presence service, the mobile device comprising:
    a transceiver configured to communicate via a network, using a network protocol, with a social presence server and a calendar server; and
    a processor operably connected to the transceiver and configured to:
      in response to a calendar event being added to a calendar application on the mobile device, synchronize the calendar event on the calendar application to the calendar server providing a calendar service to a first user;
      query, by an IP multimedia subsystem (IMS) framework in the mobile device, the calendar server for social presence information associated with the first user of the mobile device;
      modify the social presence information associated with the first user to reflect the calendar event, the modified social presence information indicating whether the first user is available for communication with a second user that is subscribed to the social presence information associated with the first user; and in response to modifying the social presence information, publish the modified social presence information to the social presence server for sharing with a second mobile device associated with the second user;

wherein, when an indication is received by the social presence server from a communication application in the second mobile device based on the second mobile device initiating a communication request with the mobile device of the first user via the communication application at a time when the modified social presence information of the first user indicates that the first user is not available for communication, the social presence server is configured to provide the modified social presence information of the first user to the second mobile device, and the communication application in the second mobile device is configured to generate an auto-reply notification indicating that the first user is not available for communication and including the modified social presence information of the first user.

11. The mobile device of claim 10, wherein the published modified social presence information associated with the first user is a trigger event for an auto-reply by the second mobile device.

12. The mobile device of claim 10, wherein the IMS framework comprises part of a rich communication services (RCS) program on the mobile device.

13. The mobile device of claim 10, wherein the mobile device of the first user is a subscriber to a different carrier than the second mobile device.

14. The mobile device of claim 10, wherein the social presence information associated with the first user further comprises location information.

15. A social presence server configured to provide a social presence service to a mobile device, the social presence server comprising a processor configured to:

receive, via a network from a first mobile device, social presence information associated with a calendar event created by a first user, wherein the social presence information indicates whether the first user is available for communication;

receive, from an IP multimedia subsystem (IMS) framework in a second mobile device associated with a second user, a subscription request for the social presence information associated with the first user;

determine that the social presence information associated with the first user can be shared with the second mobile device based on the social presence server previously receiving an invite message from the first mobile device, forwarding the invite message to the second mobile device, receiving an acceptance message from the second mobile device, and forwarding the acceptance message to the first mobile device;

after receiving the subscription request, receive an indication from a communication application in the second mobile device based on the second mobile device initiating a communication request with the first mobile device of the first user via the communication application; and in response to receiving the indication from the second mobile device at a time when the social presence information associated with the first user indicates that the first user is not available for communication, send, to the second mobile device, the social presence information of the first user, wherein the communication application in the second mobile device is configured to generate an auto-reply notification indicating that the first user is not available for communication and including details of the calendar event.

16. The social presence server of claim 15, wherein an IMS service in the social presence server is configured to receive the social presence information.

17. The social presence server of claim 15, wherein an IMS service in the social presence server is configured to receive the subscription request.

18. The social presence server of claim 15, wherein an IMS service in the social presence server is configured to send the social presence information.

* * * * *